United States Patent [19]

Helms

[11] 4,042,927
[45] Aug. 16, 1977

[54] ABILITY OF A MONOPULSE RADAR TO RESOLVE AND TRACK JAMMERS PASSIVELY

[75] Inventor: Howard D. Helms, Brookside, N.J.

[73] Assignee: The United States of America as represented by the Secretary of the Army, Washington, D.C.

[21] Appl. No.: 160,075

[22] Filed: June 25, 1971

[51] Int. Cl.² .................. G01S 7/36; G01S 9/02; G01S 9/22

[52] U.S. Cl. .................. 343/18 E; 343/5 DP; 343/16 M

[58] Field of Search ............... 343/5 DP, 16 M, 18 E

[56] References Cited

U.S. PATENT DOCUMENTS

| | | | |
|---|---|---|---|
| 3,184,739 | 5/1965 | Franklin et al. | 343/18 E |
| 3,399,404 | 8/1968 | Githens et al. | 343/5 DP |
| 3,555,549 | 1/1971 | Watkins et al. | 343/5 DP |
| 3,610,901 | 10/1971 | Lynch | 343/5 DP |
| 3,617,719 | 11/1971 | Wong et al. | 343/5 DP |

Primary Examiner—Malcolm F. Hubler
Attorney, Agent, or Firm—William G. Gapcynski; Lawrence A. Neureither; Robert C. Sims

[57] ABSTRACT

The off axis angle detector of a radar is sampled at discreet intervals by a special purpose digital computer. Each sample is directed to one of a plurality of registers in accordance to the angle indication of the sample. Each register being a counter which will give an output when it is in an overflow condition; therefore, each register acts as a threshold device. Upon one register overflowing and giving an output of that indication, the sample process is stopped and the output of the register is sent to a converter to indicate the direction of the jammer. This is done both for the azimuth and elevation angle of the radar receiver.

1 Claim, 2 Drawing Figures

Howard D. Helms,
INVENTOR,
BY Jack W. Voigt
Robert C. Sims

ABILITY OF A MONOPULSE RADAR TO RESOLVE AND TRACK JAMMERS PASSIVELY

BACKGROUND OF THE INVENTION

This invention is directed to the field of countering enemy counter measures. More particularly the invention is directed to the field of detecting the position of a "barrage" jammer. In designing a ballistic missile defense system, provisions must be made to counter various enemy counter measure devices postulated in the threat model. The active noise jammers constitute one class of enemy counter measure devices. The barrage jammer, in which the noise bandwidth of the jammer signal is much larger than the receiver bandwidth is the problem this invention is directed to. One method for countering the barrage jammer is to use the strongest pulse of the radar to burn through the jammer signal. However, this method is not always effective, since the power in the radar's return varies inversely with the fourth power of range while the jammer's power varies inversely as the second power of range. If the radar cannot burn through the power of the jammer then the only way the radar can track the jammer is to passively listen and gather angular data for triangulation by two or more radars. This problem is further complicated by the fact that there may be more than one jammer present in the radar area.

SUMMARY OF THE INVENTION

A monopulse radar may be used to fix the approximate direction of a jamming source of the strongest barrage jammer present in the radar's field of view. The approximate direction of the strongest jammer source is determined by a sky map using the sum channel. The antenna of the radar is then pointed in this directon and monopulse off axis angle signals are sampled, and a sequential detection test reveals whether one of the jammers is resolvable, and if so determines its apparent direction. The sum channel and the difference channel in a radar receiver is normally connected to a monopulse detector of radar which converts these two channels into an angle indication of the direction of the radar signal received in either azimuth or elevation. Since there is to be more than one jammer present in the field, any one sample of this direction would not necessarily give the true direction of the strongest jammer. However, on a statistical basis if a large enough number of samples are taken, more angle indications at the true angle of the strongest jammer will be present than any of the other angle indicatons detected by the monopulse detector of the radar. Therefore, this invention involves the taking of a plurality of discrete samples from the monopulse detector and storing these samples in designated registers in accordance with the particular angle detected. Before the angle information can be directed to the proper register an analog digital converter must be interposed between the monopulse detector and the register. The digital output of the analog digital converter is directed by a steering circuit to the register that corresponds to the angle information. A pulse generator generates pulses at clock frequency to control the sampling rate and to provide a pulse to the steering circuit to be stored in one of the registers. The plurality of registers are each a counter which will have an output only when it overflows. The counters will act as a threshold device, and if the count required to overflow the register is sufficiently large, only the register indicating the true direction of the strongest jammer should overflow first. When one of the registers overflows, its output is sent through an OR gate to a flip-flop which turns off the pulse generator. The output of the overflowed register is also sent through a numerical to binary converter so as to indicate the direction of the strongest jammer. The circuitry is repeated for both the azimuth and elevation angle direction of the jammer and the outputs are combined in a combining means to indicate the direction of the strongest jammer from the first radar. The second radar has the same circuitry and has an output which indicates the direction of the strongest jammer from its antenna. These two outputs are combined in a further combining means to indicate position of the strongest jammer. The combining of measurement from the two radars is a form of triangulation which can be accomplished by a computer programmed for regression analysis (or more generally, by Kalman or Bayesian techniques). The combined measurements of the two radars provide a crossfix on the location of the strongest jammer; therefore its location is determined in three dimensions. The jammer can now be intercepted as its location is sufficiently and accurately known.

DESCRIPTION OF THE PREFERRED EMBODIMENT

Figure 1:
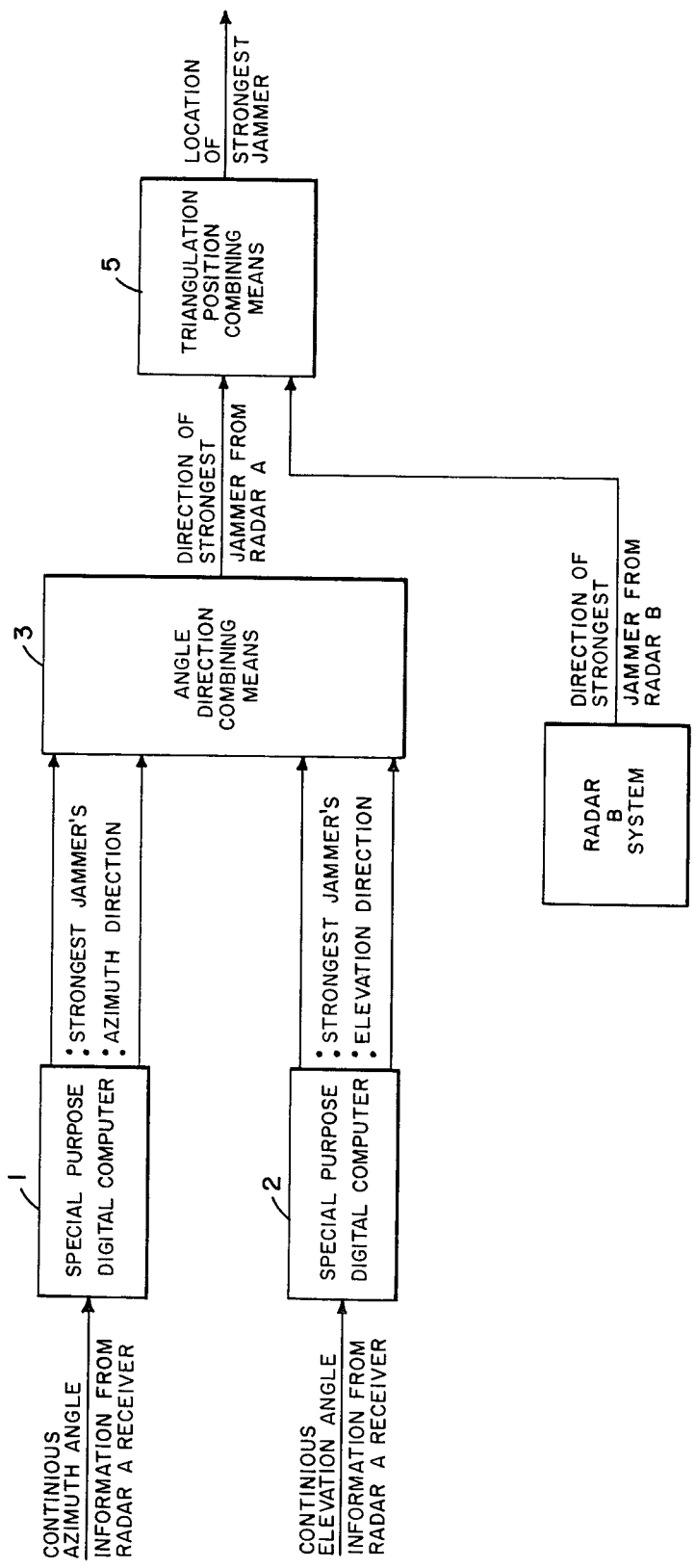
FIG. 1 is a block diagram illustrating the overall operation of the invention.

FIG. 1 shows the broad operation of the invention. Since the jammer's power is such that the radar cannot send a strong enough pulse out to burn through the jammer's signal, two radars have to be used in a passive manner which is not normal for the operation of monopulse radars. The techniques for carrying this out is shown in FIG. 1. Special purpose digital computers 1 and 2 are connected to the radar's receiver so as to receive the azimuth and elevation angle information respectively from the radar receiver. The special purpose digital computers sample the azimuth and elevation angle informaton at discrete intervals and store this information. Once the same angle indication has been repeated a predetermined number of times, this angle is fed as the output of the special purpose computer and is the direction of the strongest jammer's azimuth or elevation direction. When both special purpose digital computers have an output, the angle direction combining means 3 combines the azimuth and elevation angle directions in a manner well known in the art and has an output which is indicative of the direction of the strongest jammer from the site of radar A. This output along with a similar output from radar B is fed to triangulation position combining means 5 which is a computer programmed so as to locate the position of the jammer according to Kalman or Bayesian techniques. The output of 5 will provide a location of the strongest jammer.

Figure 2:
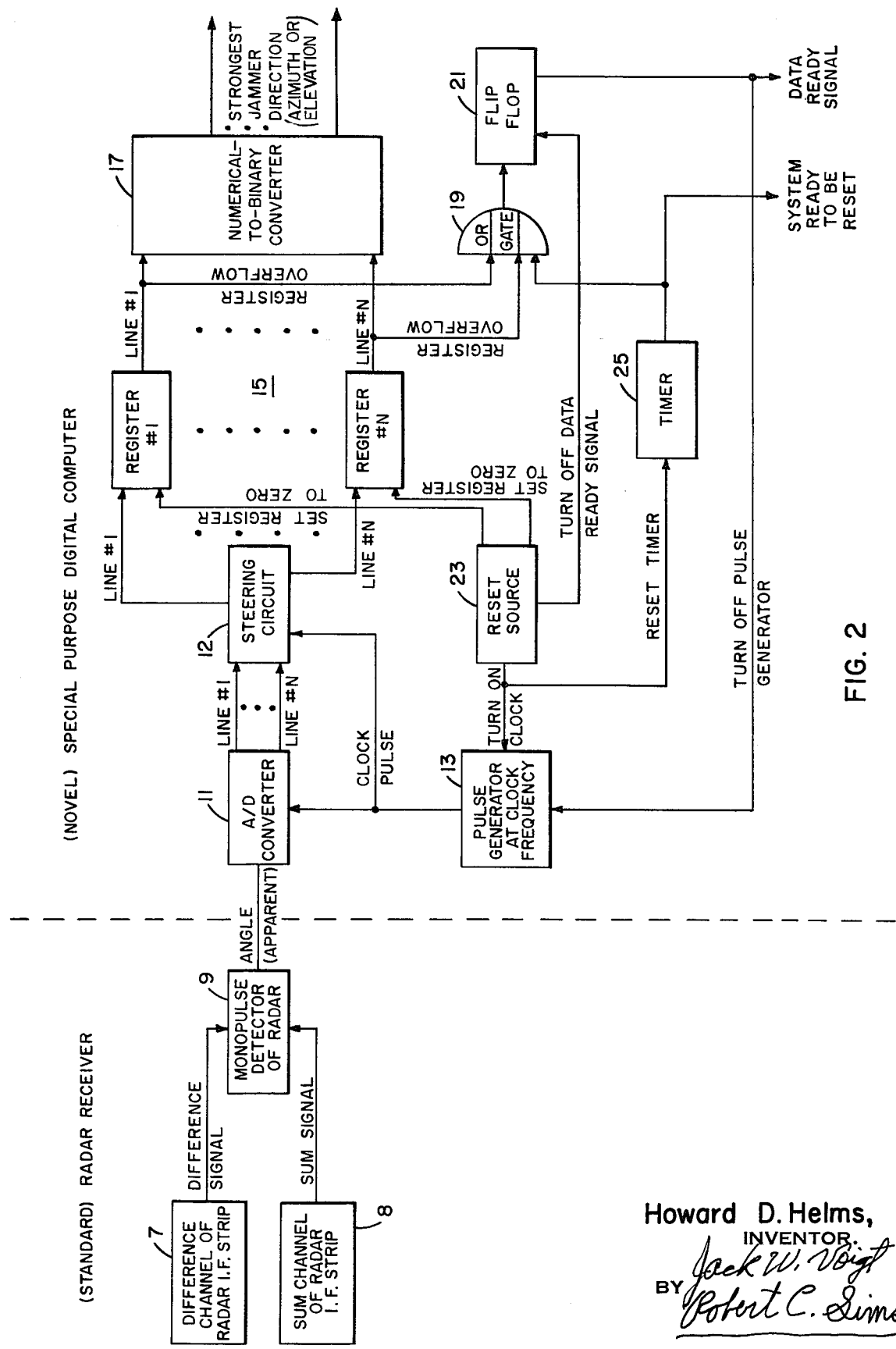
FIG. 2 is a more detailed block diagram showing the special purpose digital computer.

FIG. 2 shows the details of computer 1 or 2 (FIG. 1) to the right of the dotted line and part of a standard radar receiver to the left of the dotted line. The difference channel 7 and the sum channel 8 feed their signals to a monopulse detector of radar 9 which converts this information into an apparent angle of the received radiation. The monopulse detection of radar may be any of the known forms such as that called phase sensitive detector in Skolnik, M., An Introduction To Radar Systems, McGraw-Hill, 1962, pages 175-184, FIGS. 5.9 and 5.10. As shown in FIG. 1, there is required to be two monopulse detectors which each measure a separate component of the direction of the strongest jammer. These components would be azimuth and elevation of a dish type antenna or the direction cosines of a phase-array type of antenna. Both sets of the components are measured relative to the pointing direction of the antenna. The monopulse detector 9 of the radar measures the ratio of the difference i.f. signal to the sum i.f. signal. The algebraic sign of the output of the detector is positive if the difference signal is somewhat in phase with the sum signal; the output is negative if the difference signal is somewhat out of phase with the sum signal. The analog to digital converter 11 converts the continuous analog signal into discreet digital signals consisting of $n$ bits. The analog to digital converter 11 can take the shape of any of the well known analog to digital converters. The steering circuit 12 steers a clock pulse from the pulse generator 13 into one of the registers 15 in accordance to the binary number emerging from the analog to digital converter 11. The steering circuit can be implemented as a simple binary tree, such as the well known circuits used to steer pulses into magnetic core memories. Examples of binary trees are found in "Logical Design of Digital Computers" by Montgomery Phister, Jr., sixth printing, December, 1961, Library of Congress catalog card No: 58-6082, pages 180-183 and "Electronic Digital Computers" by Charles V. L. Smith, 1959, Library of Congress catalog card No: 58-10009, pages 165-167 and pages 356-358. The steering circuit therefore can be regarded as an ordinary binary tree. A pulse is first switched into the top or bottom of the tree depending on the most significant bit obtained from the analog to digital converter. Then the pulse is shifted up or down through the next stage of the tree depending on whether the next most significant bit is a 1 or 0. This process repeats for a total of $n$ times, (corresponding to the $n$ bits obtained from the analog to digital converter) so that the pulse can appear at any of the $2n$ ports of the steering circuit. The registers 15 are ordinary counter type registers. Each register accumulates pulses until it overflows. Upon overflowing the register will present a numerical number to the numerical to binary converter 17. This number corresponds to a certain angular position of the strongest jammer direction. The numerical to binary converter (which is constructed of OR gates) changes the register number into a binary number which denotes the apparent direction of the strongest jammer source. The register overflow signals are also passed into an OR gate 19 which turns on a flip-flop 21 which in turn indicates whether any of the registers have overflowed as a data ready signal. Flip-flop 21 turns off the pulse generator 13, which has been producing pulses at a constant rate roughly equal to the bandwidth of the i.f. strips. A reset source 23 such as a button on a console or a signal from another computer turns on the pulse generator and resets all the registers to zero when the next run is desired. The reset source could be a human operator who notes the data ready signal from flip-flop 22 which may be connected to a signal light. The output from flip-flop 21 could be connected directly to reset source 23 so as to automatically recycle the system. A timer 25 could be provided to turn off the system after a predetermined time in the event that the strongest jammer could not be determined in a predetermined number of samples. The timer would be connected to be reset by the reset source 23 also.

The operation of the special purpose digital computer shown in FIG. 2 is as follows: successive clock pulses from pulse generator 13 cause the analog to digital converter 11 to sample, quantize, and encode its input from the radar receiver. The steering circuit 12 directs the clock pulses to the register as determined by the binarial number held on the $n$ output ports of its analog to digital converter. The ports of course have a logical level 1 or 0. If any register overflows, it generates a step functon signal which passes through OR gate 19 and causes the flip-flop 21 to change states. The flip-flop then outputs a step functon signal (indicating that the data is ready to be read) and causes the pulse generator 13 to turn off. The reset source 23 sends a signal to the registers 15 to reset them to zero, returns the flip-flop to its original state, turns on the pulse generator 13, and resets timer 25 and turns it on. The process is then repeated until all desired measurements have been taken. Before these measurements can be obtained on the strongest jammer in some other direction, it is necessary to point the radar antenna in this new direction. Even when taking measurements on a single jammer, it is necessary to point the beam in a different direction after each data ready signal has occurred, so that the beam can follow the target as it moves. The measurements of the angles of the strongest jammer is combined with measurements from other radars located some distance from the radar A as shown in FIG. 1. This combining of measurements from two or more radars is a form of triangulation which can be accomplished by regression analysis. The combined measurements provide a cross-fix on the location of the jammer. The location is thereby determined in three dimensions, and the jammer can now be intercepted.

The equipment of FIG. 2 is designed to resolve jammers which are of a relative power difference of 3db or larger. A convenient number of the registers 15 would be 64. The maximum number of samples to be processed by the special purpose digital computer can be varied by making the timer 25 a variable timer. For example, the maximum sample size could be $2^{16} = 65,536$. If the samples could be sampled at 100 nanosecond intervals, maximum time required would be 6.55 milliseconds. This time might represent the total time contained in several disjoint intervals between which the radar performs other functions. The size or maximum count of the individual registers 15 represents the threshold value of the system. It has been estimated that the probability of error would be eliminated in the worst case by a threshold size of 1,720, therefore using the nearest power of 2, the size of the register would be $2^{11} = 2,048$. However, it should be noted that one useful feature of this invention is that if one of the jammers is substantially stronger than the other jammers, the test will terminate much more rapidly as the number of samples falling into the proper direction will be at a higher percentage rate; therefore overflowing the proper counter sooner. Should jammers be unresolvable, i.e. The sequential direction test terminates before any register is filled, it would be apparent that two or more closely matched jammers were present in the radar beam, or else that the radar was observing a distributive noise generator such as a fireball. This would be useful information to the operator.

I claim:

1. A detector comprising an input means having an input which receives continuous information and a plurality of outputs; a control means connected to said input means so as to cause the input means to sample the continuous information at discrete intervals and present the sampled information at its outputs; a plurality of counters; steering means connected between outputs of the input means and the inputs of the counters so as to cause a predetermined counter to count one each time a corresponding predetermined range of sample information is sampled by the input means; each of said counters having an output when it over-flows; and an output means connected to said counters so as to indicate which counter has overflowed; said control means is a pulse generator which is further connected to the steering means so as to provide a pulse to be delivered to the proper counter; and further comprising an OR gate having a plurality of inputs connected to the overflow outputs of the plurality of counters; and a flip-flop means having an input connected to the output of the OR gate and an output connected to the pulse generator so as to turn off said pulse generator when an overflow of one counter is sensed by the OR gate.

* * * * *